US011916587B2

(12) United States Patent
Lakdawala et al.

(10) Patent No.: US 11,916,587 B2
(45) Date of Patent: Feb. 27, 2024

(54) DYNAMIC SUBHARMONIC MIXING FOR POWER REDUCTION IN WIRELESS COMMUNICATIONS

(71) Applicant: QUALCOMM Incorporated, San Diego, CA (US)

(72) Inventors: Hasnain Lakdawala, San Diego, CA (US); Ahmed Abbas Mohamed Helmy, San Diego, CA (US); Francesco Gatta, San Diego, CA (US); Balasubramanian Ramachandran, Hyderabad (IN); Ketan Humnabadkar, San Jose, CA (US); Andrea Fenaroli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/485,016

(22) Filed: Sep. 24, 2021

(65) Prior Publication Data

US 2023/0095161 A1    Mar. 30, 2023

(51) Int. Cl.
*H04B 1/403*    (2015.01)
*H04W 72/23*    (2023.01)

(52) U.S. Cl.
CPC ............ *H04B 1/403* (2013.01); *H04W 72/23* (2023.01)

(58) Field of Classification Search
CPC ......... H04B 1/403; H04B 1/28; H04W 72/23; H04W 52/0216; H04W 52/0238; H04W 52/0245; H04W 52/0258; H04L 5/0092
See application file for complete search history.

(56) References Cited

U.S. PATENT DOCUMENTS

| 4,386,321 | A  | * | 5/1983 | Savage | H04B 1/66 327/256 |
| 7,711,327 | B2 | * | 5/2010 | Sowlati | H03L 7/23 455/76 |
| 8,538,365 | B2 | * | 9/2013 | Croman | H04W 52/0245 455/296 |
| 8,818,311 | B2 |   | 8/2014 | Persico et al. | |
| 9,439,193 | B2 | * | 9/2016 | Yang | H04W 16/14 |
| 10,177,873 | B1 | * | 1/2019 | Zeng | H04B 1/0057 |

(Continued)

OTHER PUBLICATIONS

International Search Report and Written Opinion—PCT/US2022/043235—ISA/EPO—dated Jan. 4, 2023.

(Continued)

*Primary Examiner* — Ayaz R Sheikh
*Assistant Examiner* — Tarell A Hampton
(74) *Attorney, Agent, or Firm* — Patterson + Sheridan L.L.P.

(57) ABSTRACT

Techniques and apparatus are described for reducing power consumption when performing wireless communications by dynamically changing the frequency of a local oscillator signal for a radio frequency (RF) downconversion circuit, based on signal conditions. An example method includes receiving an RF signal and downconverting the RF signal using an oscillating signal with a first frequency at a first time. The method also includes switching to downconverting the RF signal using the oscillating signal with a second frequency, based on a property associated with the RF signal at a second time. The second frequency is a subharmonic of the first frequency.

18 Claims, 7 Drawing Sheets

(56) References Cited

U.S. PATENT DOCUMENTS

| | | | |
|---|---|---|---|
| 2002/0138229 A1* | 9/2002 | Wilborn | G01S 11/02 |
| | | | 702/150 |
| 2002/0183030 A1 | 12/2002 | Damgaard et al. | |
| 2003/0134658 A1* | 7/2003 | Kaminski | H04W 36/0088 |
| | | | 455/423 |
| 2004/0063419 A1 | 4/2004 | Molnar et al. | |
| 2004/0097211 A1 | 5/2004 | Dubash et al. | |
| 2005/0041589 A1* | 2/2005 | Kwon | H04W 52/286 |
| | | | 370/349 |
| 2007/0211837 A1* | 9/2007 | Zipper | H04B 1/28 |
| | | | 375/350 |
| 2008/0143580 A1* | 6/2008 | Glazko | H04K 3/228 |
| | | | 342/17 |
| 2008/0153447 A1* | 6/2008 | Cowley | H03G 3/3052 |
| | | | 455/296 |
| 2013/0207839 A1* | 8/2013 | Simic | G01S 19/33 |
| | | | 342/357.59 |
| 2014/0179251 A1* | 6/2014 | Persico | H04B 1/16 |
| | | | 455/226.2 |
| 2014/0254349 A1* | 9/2014 | Jia | H04W 28/0252 |
| | | | 370/216 |
| 2015/0244548 A1* | 8/2015 | Weissman | H04B 17/0082 |
| | | | 455/42 |
| 2016/0192381 A1* | 6/2016 | Gao | H04W 84/12 |
| | | | 370/330 |
| 2019/0082406 A1 | 3/2019 | Akkarakaran et al. | |
| 2020/0229088 A1* | 7/2020 | Wang | H04W 52/0225 |
| 2021/0127452 A1* | 4/2021 | Uchida | H04W 88/027 |
| 2021/0212062 A1* | 7/2021 | Kurian | H04W 72/0453 |

OTHER PUBLICATIONS

Kale A., et al., "A −40 dB EVM, 77 MHz Dual-Band Tunable Gain Sub-Sampling Receiver Front End in 65-nm CMOS", IEEE Transactions on Circuits and Systems-I: Regular Papers, vol. 66, No. 3, Mar. 2019, pp. 1166-1179.

* cited by examiner

DYNAMIC SUBHARMONIC MIXING FOR POWER REDUCTION IN WIRELESS COMMUNICATIONS

BACKGROUND

Field of the Disclosure

Certain aspects of the present disclosure generally relate to wireless communications and, more particularly, to techniques and apparatus for dynamically changing the frequency of a signal for a frequency mixing circuit, based on signal conditions.

Description of Related Art

Electronic devices include computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. These systems may be capable of supporting communication with multiple users by sharing the available system resources (e.g., time, frequency, and power). Examples of such systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system).

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include radio frequency (RF) front-end circuitry, which may be used for communication within a millimeter wave (mmW) communication band, for example. The RF front-end circuitry may operate in multiple communication modes, some of which can increase power consumption of the communication device.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide a method of wireless communication by an apparatus. The method generally includes receiving a radio frequency (RF) signal. The method also includes downconverting the RF signal using an oscillating signal with a first frequency at a first time. The method further includes switching to downconverting the RF signal using the oscillating signal with a second frequency, based on a property associated with the RF signal at a second time. The second frequency is a subharmonic of the first frequency.

Certain aspects of the present disclosure provide an apparatus for wireless communication. The apparatus includes a frequency synthesizer configured to generate an oscillating signal. The apparatus also includes a mixer coupled to the frequency synthesizer and configured to downconvert a radio frequency (RF) signal using the oscillating signal. The frequency synthesizer is configured to generate the oscillating signal with a first frequency at a first time. The frequency synthesizer is also configured to switch to generating the oscillating signal with a second frequency, based on a property associated with the RF signal at a second time. The second frequency is a subharmonic of the first frequency.

Certain aspects of the present disclosure provide an apparatus. The apparatus includes means for receiving a radio frequency (RF) signal. The apparatus also includes means for downconverting the RF signal using an oscillating signal with a first frequency at a first time. The apparatus further includes means for switching to downconverting the RF signal using the oscillating signal with a second frequency, based on a property associated with the RF signal at a second time. The second frequency is a subharmonic of the first frequency.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure generally relate to techniques and apparatus for dynamically performing subharmonic mixing when operating in certain wireless communication modes. More specifically, aspects provide techniques for dynamically changing the frequency of a signal (e.g., a local oscillator signal, which may be a radio frequency (RF) signal) using a subharmonic of a fundamental frequency of the signal, based on signal conditions (e.g., of a received RF signal). The techniques described herein can reduce power consumption of a communication device when operating in certain wireless communication modes (e.g., physical downlink control channel (PDCCH) mode).

For example, in some wireless communication systems (e.g., LTE, 5G, etc.), a UE may operate in a communication mode in which the UE monitors for incoming traffic (addressed to the UE) from a network. One reference example of such a communication mode is PDCCH mode. One issue with this mode is that operating in PDCCH mode can consume a lot of power, especially for the higher frequencies used in 5G. For example, while operating in PDCCH mode, the UE may frequently wake up to determine if there is a packet (e.g., PDCCH, downlink control information (DCI), etc.) addressed to the UE. In some cases, the UE can spend a substantial amount of time in PDCCH mode, accounting for a significant amount of the UE's power consumption.

To address this, aspects provide techniques for dynamically performing subharmonic mixing to reduce power consumption of the UE when operating in certain communication modes, such as PDCCH mode. For example, there may be instances in which the UE has excess signal-to-noise ratio (SNR) margin when the UE is operating in PDCCH mode or other modes. In these instances, aspects can use dynamic subharmonic mixing to trade off at least some of the excess SNR margin for reduced power consumption.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Example Wireless Communications

Figure 1:
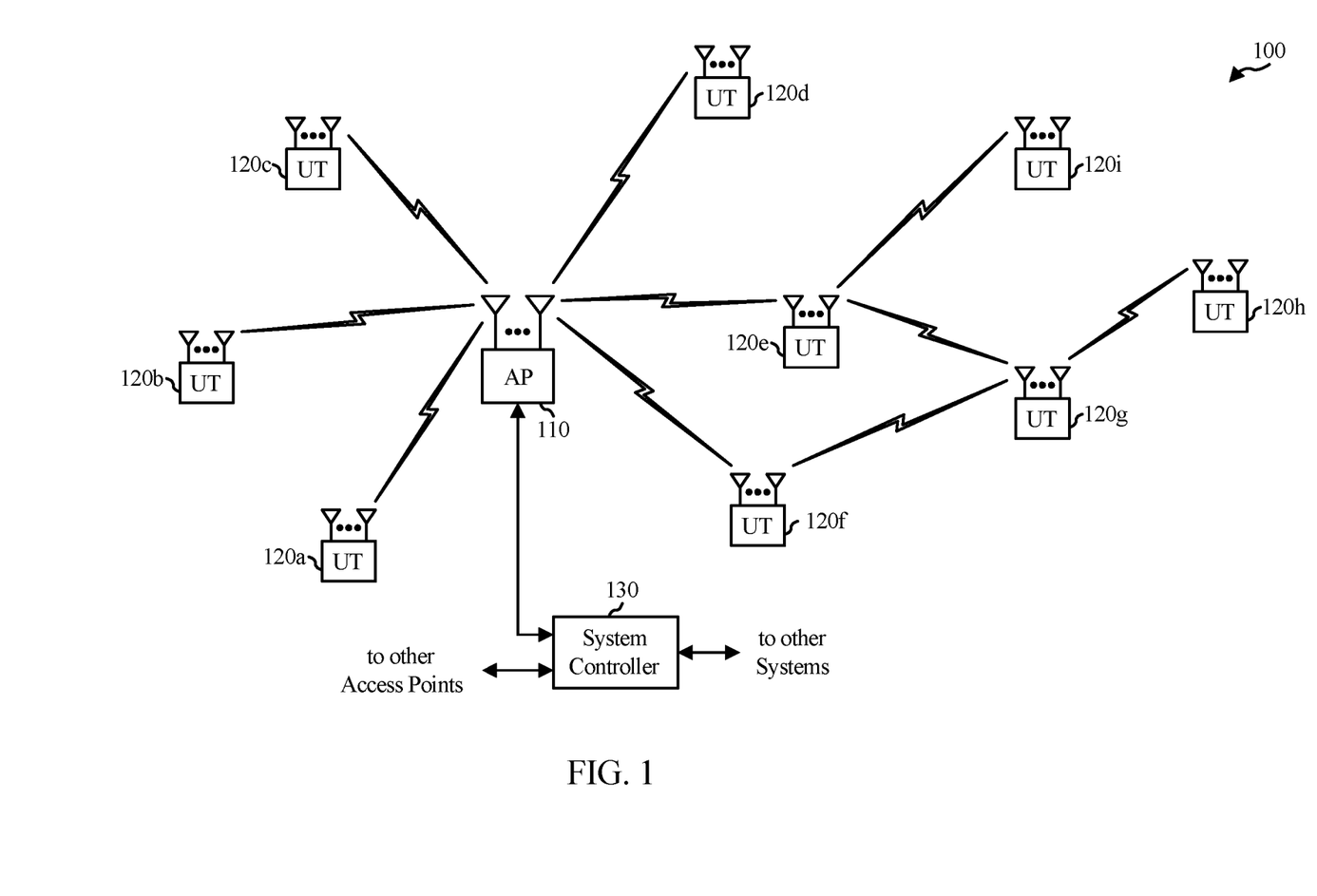
FIG. 1 is a diagram of an example wireless communications network, in accordance with certain aspects of the present disclosure.

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), a next generation Node B (gNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set Nu of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The Nu selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported). In some aspects, the access point 110 and/or the user terminal 120 may include a transceiver front end (also known as a radio frequency front end (RFFE) configured to dynamically perform subharmonic mixing to reduce power consumption when operating in certain communication modes, as described in more detail herein.

Figure 2:
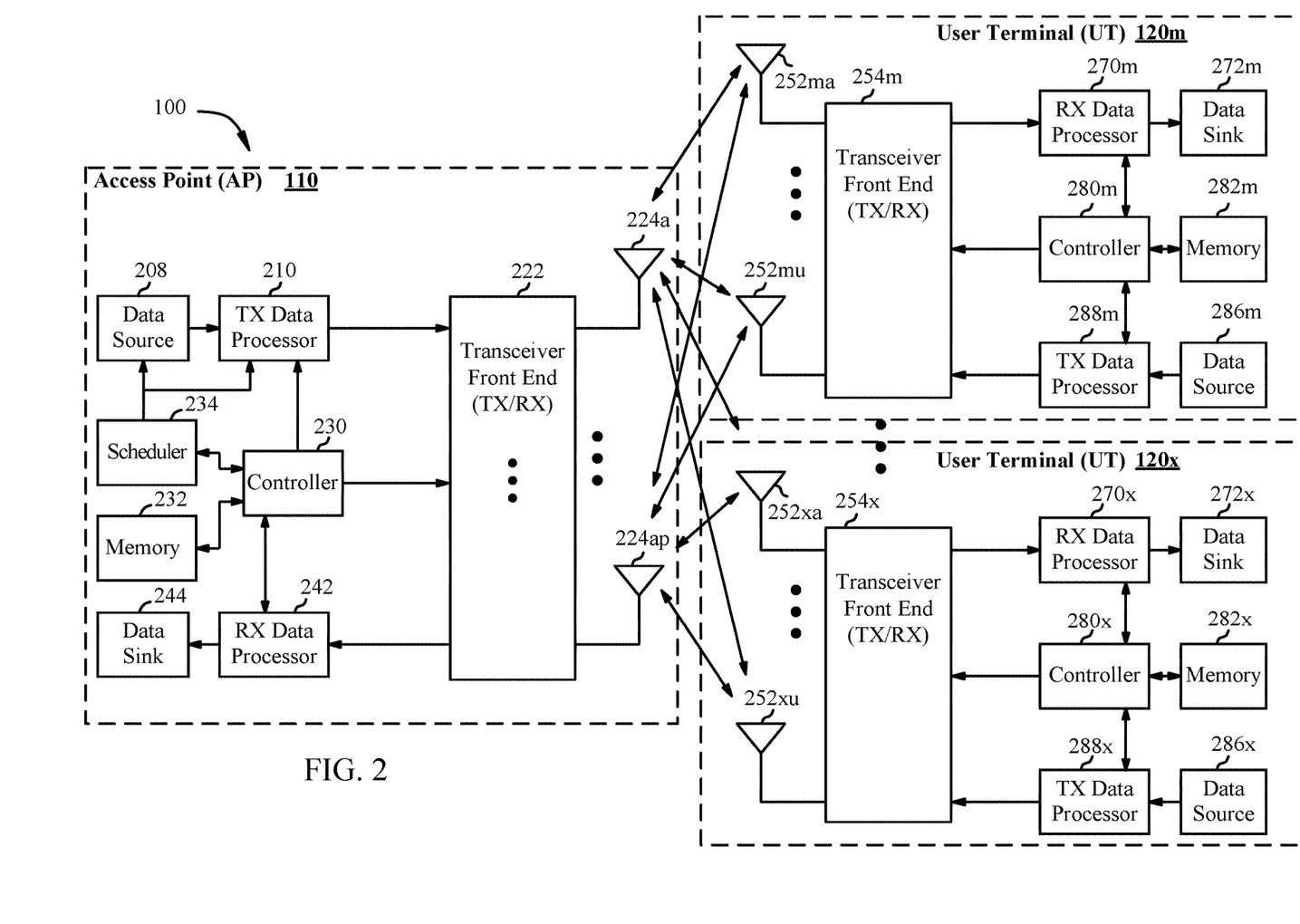
FIG. 2 is a block diagram of an example access point (AP) and example user terminals, in accordance with certain aspects of the present disclosure.

FIG. 2 shows a block diagram of access point 110 and two user terminals 120m and 120x in the wireless communications system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via one or more frequency channels, and a "receiving entity" is an independently operated apparatus or device capable of receiving data via one or more frequency channels. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering, beamforming, or some other spatial processing technique may be used at the access point and/or user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a RFFE) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one or more of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal. In some aspects, the transceiver front end 222 and/or 254 may be configured to dynamically perform subharmonic mixing to reduce power consumption when operating in certain communication modes, as described in more detail herein.

Figure 3:
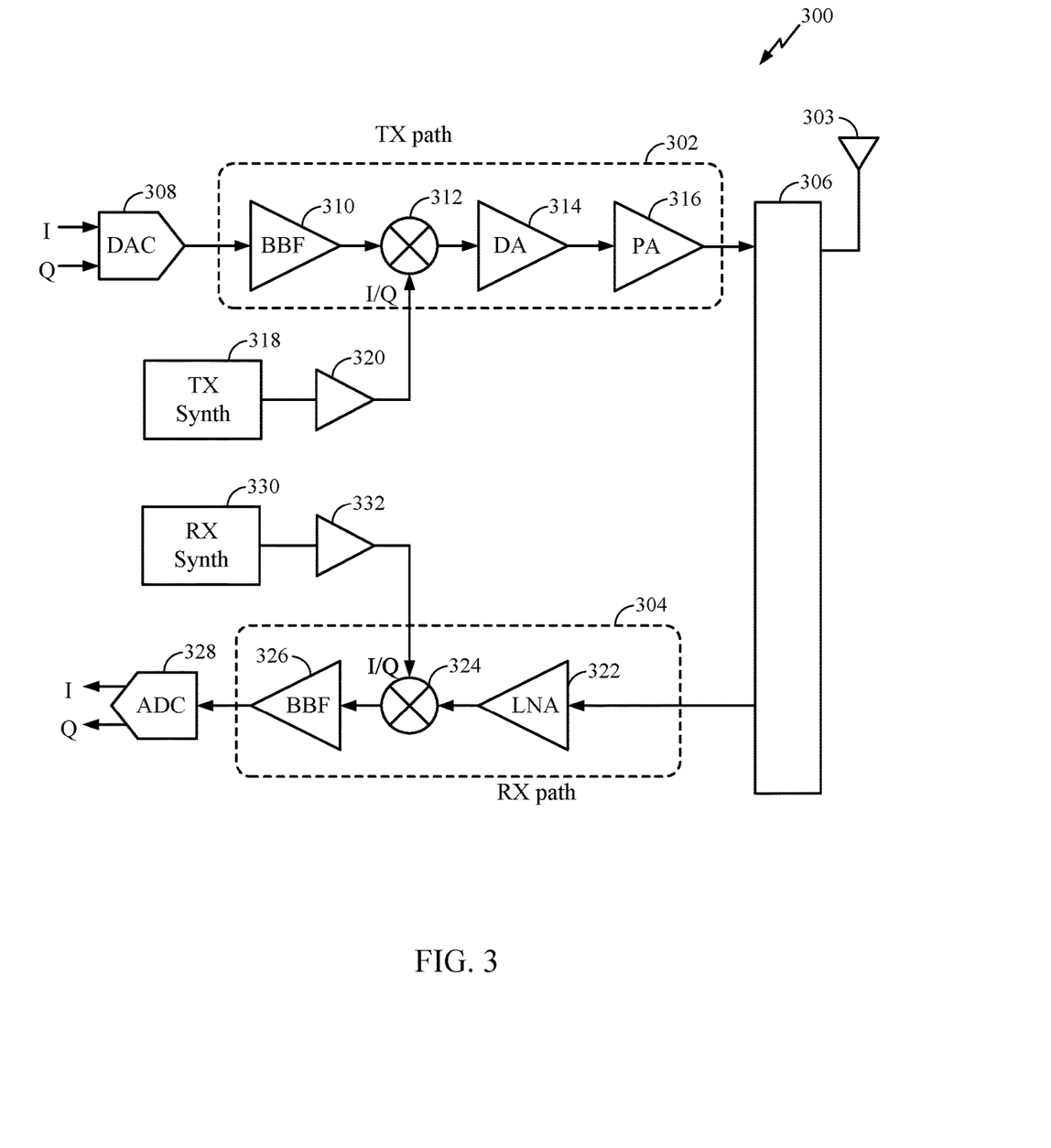
FIG. 3 is a block diagram of an example transceiver front end, in accordance with certain aspects of the present disclosure.

FIG. 3 is a block diagram of an example transceiver front end 300, such as transceiver front end 254 or transceiver front end 222 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like. Note that although a single RX path and a single TX path are depicted in FIG. 3, the transceiver front end 300 can include multiple RX paths and/or multiple TX paths which can be connected to one or more antennas 303.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. The LNA 322 may have an adjustable gain. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert the RF signal to a baseband signal). The baseband signals output by the mixer 324 may be filtered by the BBF 326 before being converted by an analog-to-digital converter (ADC) 328 to digital I or Q signals for digital signal processing.

Although the block diagram of FIG. 3 depicts the transceiver front end 300 as a homodyne configuration utilizing a single frequency conversion, aspects of the present disclosure are not limited to this configuration. For example, one or more of the TX path 302 or the RX path 304 can be configured as a superheterodyne configuration utilizing more than one frequency conversion. For example, in the RX path 304, a first mixer (not shown, but replacing mixer 324) may be utilized to downconvert a received RF signal to an intermediate-frequency (IF) signal using a first LO signal, and a second mixer (not shown) may be utilized to downconvert the IF signal to a baseband (BB) signal using a second LO signal.

While it is desirable for the output of an LO to remain stable in frequency, tuning the LO to different frequencies may entail using a variable-frequency oscillator. Some systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324.

In some aspects, the RX frequency synthesizer 330 (and/or the TX frequency synthesizer 318) may be configured to dynamically change the LO frequency (e.g., based on signal conditions or other network knowledge) to switch between performing fundamental mixing and subharmonic mixing, as described in more detail herein.

Example Dynamic Subharmonic Mixing for Power Reduction in Wireless Communications In certain wireless communication systems (e.g., LTE, 5G, etc.), communication devices may spend a substantial amount of time operating in certain communication modes that account for a significant amount of the power consumption of the communication device. As a reference example, in 5G systems, the UE may spend a substantial amount of time operating in a PDCCH mode, in which the UE waits for a packet (addressed to the UE) from the network.

Operating bands in 5G are generally higher in frequency than operating bands associated with other wireless communication systems. For example, 5G may support up to 4.4 gigahertz (GHz) for the n77 band (commonly referred to as the C-band). Consequently, 5G operating bands may consume a larger amount of current in PDCCH (which carries DCI), compared to other operating bands. In particular, the power consumption in standalone 5G operation may be dominated by the PDCCH current consumption. For example, to meet low latency specifications associated with 5G, the UE may frequently enter this mode, in which the transceiver waits for a packet addressed to the UE.

In some cases, when a communication device is operating in a particular communication mode, such as PDCCH mode, there may be instances in which the communication device has excess SNR margin that can be traded off for power consumption. For example, because PDCCH mode is generally used to detect whether a data transmission to the UE will occur, the SNR specification (or demand) associated with this mode may be low, compared to other communication modes. Given the low SNR specification associated with this mode, there may be instances in which the signal power is sufficiently high (e.g., above a threshold), resulting in excess SNR margin. As a reference example, the signal power may be sufficiently high in cases where the UE is in close proximity to a base station, the UE is not subject to interference from one or more jammers, etc.

Accordingly, aspects described herein provide techniques for dynamically performing subharmonic mixing to reduce the power consumption when operating in certain communication modes. In some aspects, the dynamic subharmonic mixing described herein may include dynamically switching (or changing) the frequency of a local oscillator (LO) signal in an RF downconversion circuit (e.g., within the transceiver front end 222 or 254), based on signal conditions. Using the techniques described herein, a received RF signal may be downconverted using a subharmonic of the fundamental frequency of the LO signal. By dynamically switching to downconverting an RF signal using a subharmonic frequency to save power in certain communication modes (e.g., PDCCH mode), aspects can significantly reduce power consumption of the communication device.

Figure 4:
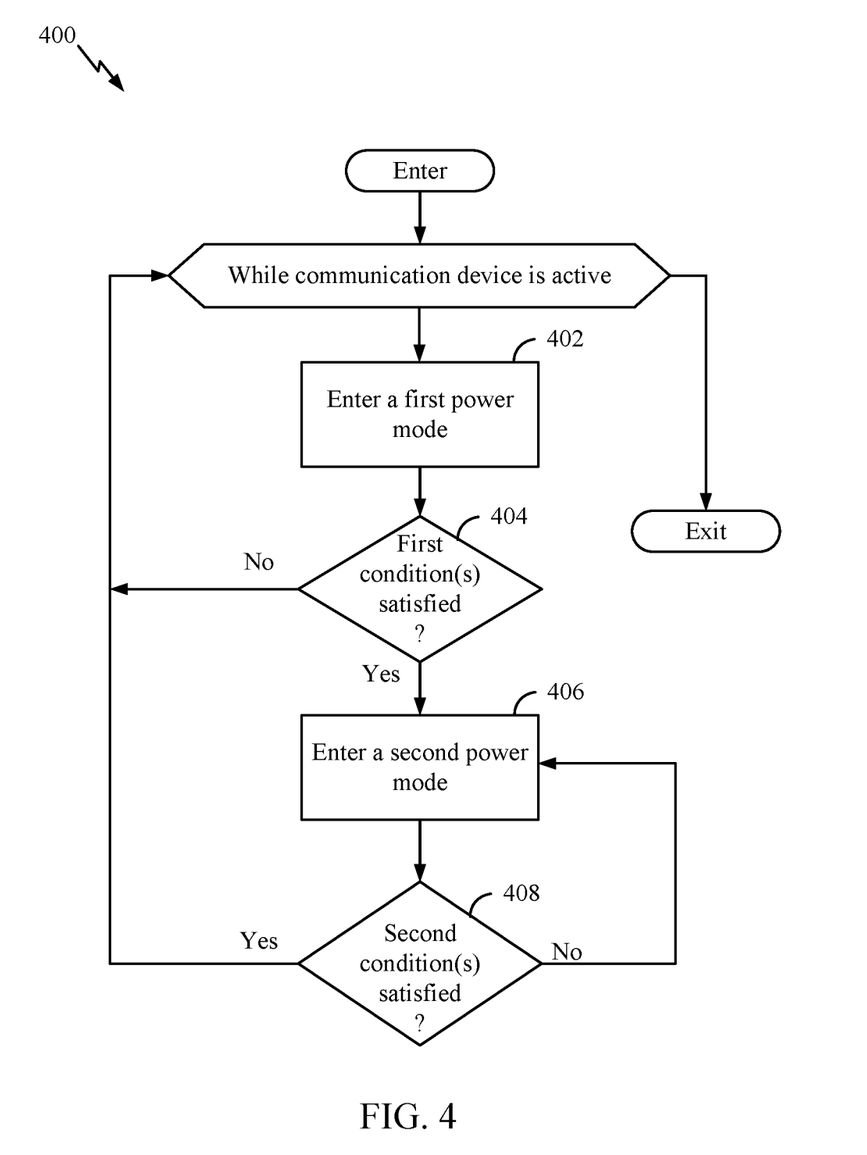
FIG. 4 is a flowchart of a method for operating a communication device, in accordance with certain aspects of the present disclosure.

FIG. 4 is a flowchart of a method 400 for operating a communication device (e.g., a UE), in accordance with certain aspects of the present disclosure. The method may be performed by a communication device (e.g., a UE). The method 400 may be performed while the communication device is active (e.g., while the communication device is in a connected mode).

Method 400 may enter at block 402, where the communication device enters (and operates) in a first power mode. In some cases, the first power mode may be a high power mode. For example, the communication device may use the high power mode when operating in a first communication mode in which there is a high SNR standard (or demand) (e.g., above a first threshold) and/or a low standard for allowed disruption time (e.g., below a second threshold) due to missed packets. In one example, the first communication mode may be a PDCCH mode having a high SNR standard (e.g., the UE may be in the presence of jammers and/or the UE may be at a cell edge).

In other cases, the first power mode may be a low power mode (out of multiple low power modes) supported by the communication device. For example, the communication device may use a particular low power mode when operating in a second communication mode in which there is a lower SNR standard (relative to the first communication mode) and/or a higher standard for allowed disruption time (relative to the first communication mode). In one example, the second communication mode may be a PDCCH mode having a low SNR standard (e.g., the UE may not be in the presence of jammers and/or the UE may be in close proximity to a base station).

At block 404, the communication device determines whether one or more first predetermined conditions are satisfied. In one aspect, the predetermined condition(s) can include at least one of: (i) a determination that the SNR standard is low (e.g., below a threshold), (ii) a determination that the communication device has excess SNR margin, or (iii) a determination that the communication device is not susceptible to one or more jammers. As noted above, there may be instances when the UE is operating in a communication mode (e.g., PDCCH mode) with excess SNR margin, due to the communication mode having a low SNR standard and the communication device having a high signal strength due to being in close proximity to a base station, for example.

If the communication device determines that the first condition(s) are not satisfied, the communication device may continue operating in the first power mode (assuming the communication device is active). On the other hand, if the communication device determines that the first condition(s) are satisfied, then the communication device enters and operates in a second power mode (block 406).

In one aspect, the second power mode may be one of the plurality of low power modes supported by the communication device. In the second power mode, the communication device may perform subsampling (based on a subharmonic of the fundamental frequency of an LO signal) to reduce power consumption of the communication device. For example, in PDCCH mode, when the SNR standard is low, the second power mode (subsampling mode) may be enabled. In the subsampling mode, the communication device may tune a LO (e.g., implemented by an RX frequency synthesizer 330 to produce a receive LO frequency) to a new frequency $F_{new}$ using the following Equation (1):

$$F_{new} = \frac{F_{rf}}{(2n+1)} \quad (1)$$

where $F_{rf}$ is the frequency of the LO signal and n=1, 2, 3 . . . to generate odd subharmonics.

In some cases, using Equation (1) to tune the LO to $F_{new}$ may cause a RX path gain reduction. For example, the gain may be reduced by $\log_{10}(2n+1)$ over the fundamental frequency. In some aspects, the reduction in gain may be recovered in a BBF (e.g., BBF 326). For example, the BBF may have a higher gain when the communication device is using the second power mode, relative to the gain of the BBF when the communication device is using the first power mode.

At block 408, the communication devices determines whether a second one or more predetermined conditions are satisfied. In one aspect, the second predetermined condition(s) can include detection of a presence of a jammer. For example, in some cases, the presence of a jammer may be detected when the SNR is low (e.g., below a first threshold) and the total signal power (e.g., received signal strength indicator (RSSI)) is high (e.g., above a second threshold).

If the communication device determines that the second predetermined condition(s) are satisfied, then the communication device may enter the first power mode (e.g., at block 402) (assuming the communication device is active). On the other hand, if the communication device determines that the second predetermined condition(s) are not satisfied, then the communication device may continue operating using the second power mode.

Figure 5:
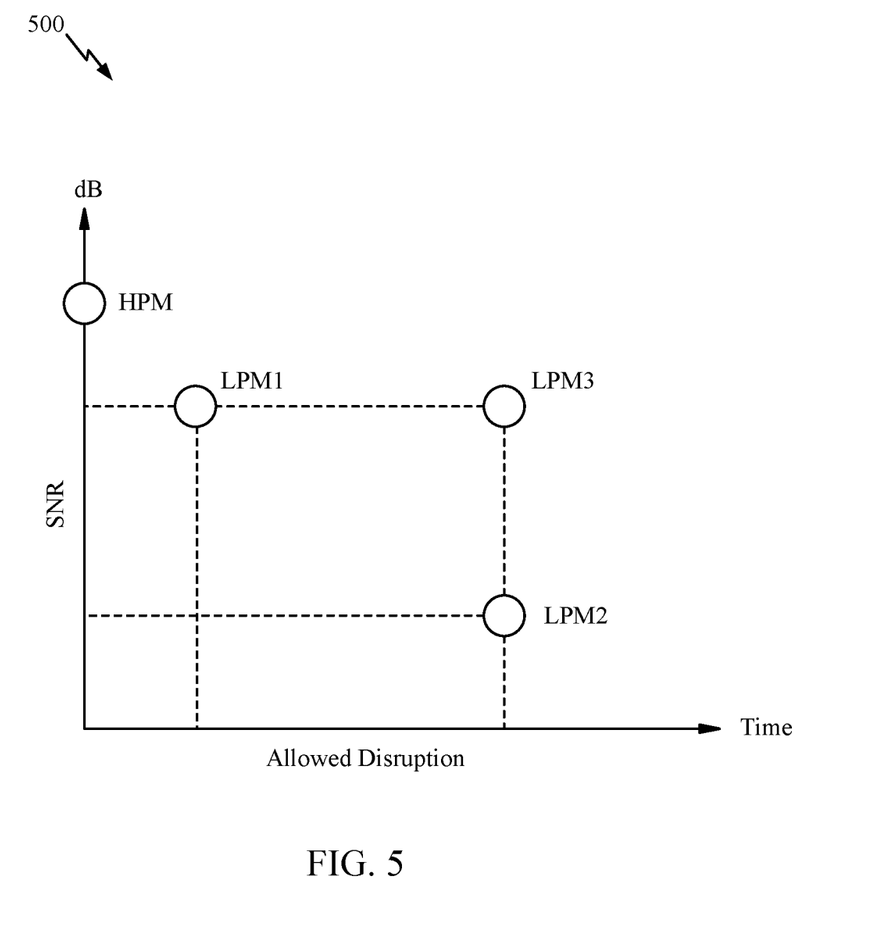
FIG. 5 illustrates example power modes supported by a communication device, plotted on a graph of signal-to-noise ratio (SNR) versus allowed disruption time, in accordance with certain aspects of the present disclosure.

Note that while FIG. 4 describes the communication device operating with a first power mode and a second power mode, in some aspects the communication device can be configured to support multiple power modes. FIG. 5, for instance, is a graph 500 of SNR versus allowed disruption time, illustrating multiple example power modes that can be supported by a communication device, in accordance with certain aspects of the present disclosure. In this example, the communication device may support a high power mode (HPM) and multiple low power modes (LPMs) (e.g., LPM1, LPM2, LPM3). In each of the HPM, LPM1, LPM2, and LPM3, the communication device may use a different amount of its processing capability (and different current draw) in order to meet the SNR standard and allowed disruption time for a given communication mode. For example, the communication device may use a highest amount of its processing capability in HPM, whereas the communication device may use a lower amount of its processing capability in LPM2. In LPM1 and LPM3, the communication device may use an amount of processing capability that is lower than the amount of processing capability used in HPM, but higher than the amount of processing capability used in LPM2. In some cases, the amount of processing capability used in LPM3 may be lower than the amount of processing capability used in LPM1 (e.g., due to LPM3 supporting a longer amount of allowed disruption time than LPM1). In some cases, the first power mode described above with respect to FIG. 4 can include the HPM, LPM1, or LPM3. In some cases, the second power mode described above with respect to FIG. 4 can include LPM2.

The communication device may enter a given power mode, depending on the SNR standard and allowed amount of disruption (in terms of time). For example, assuming the communication device is operating in LPM2 (and performing subsampling), the communication device may transition to operating in HPM, LPM1, or LPM3 (with regular sampling) upon detecting the presence of a jammer. In this example, the detection of the presence of the jammer may cause the communication device to enter a communication mode having a higher SNR standard and/or a lower amount of allowed disruption time.

Figure 6:
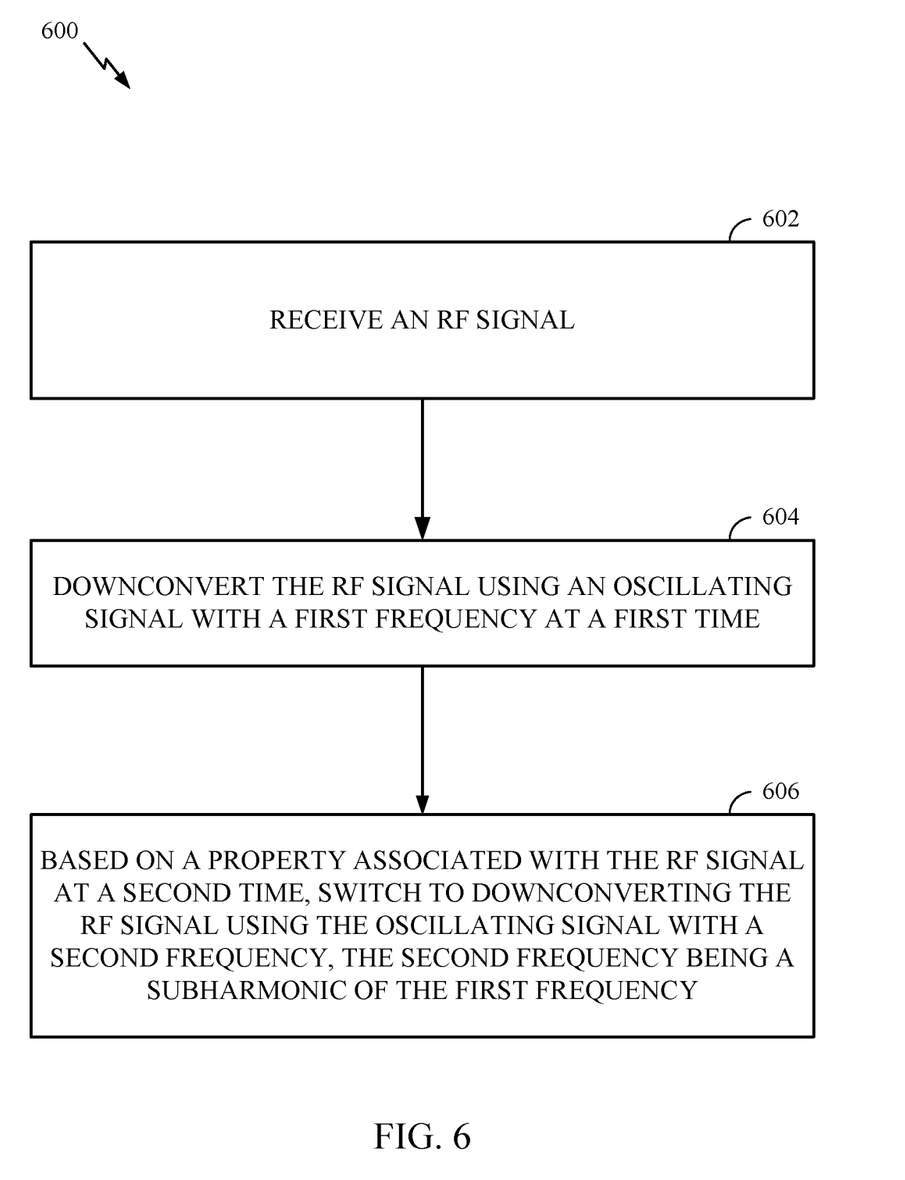
FIG. 6 is a flow diagram of example operations for wireless communications, in accordance with certain aspects of the present disclosure.

FIG. 6 is a flow diagram of example operations 600 for wireless communications, in accordance with certain aspects of the present disclosure. The operations 600 may be performed by an apparatus (e.g., transceiver front end 222, transceiver front end 254, transceiver front end 300, etc.).

The operations 600 may begin, at block 602, where the apparatus receives an RF signal. In some aspects, the RF signal can include a PDCCH. In some aspects, the RF signal can include DCI.

At block 604, the apparatus downconverts the RF signal using an oscillating signal with a first frequency at a first time. For example, the apparatus may include a frequency synthesizer (e.g., RX frequency synthesizer 330) and a mixer (e.g., mixer 324) coupled to the frequency synthesizer. In this example, the frequency synthesizer can generate an oscillating signal (e.g., LO signal) with the first frequency at the first time, and the mixer can downconvert the RF signal using the oscillating signal.

The apparatus may further include a filter (e.g., BBF 326) that filters a downconverted signal (e.g., generated from the downconversion using the first frequency). In some aspects, the apparatus may downconvert the RF signal using the oscillating signal with the first frequency during a regular sampling mode of the apparatus. During the regular sampling mode, the apparatus may be in a first power mode (e.g., first power mode described with respect to FIG. 4).

At 606, the apparatus switches to downconverting the RF signal using the oscillating signal with a second frequency, based on a property associated with the RF signal at a second time. The second frequency is a subharmonic of the first frequency. For example, the frequency synthesizer can switch to generating an oscillating signal (e.g., LO signal) with the second frequency, and the mixer can downconvert the RF signal using the oscillating signal. In some aspects, the apparatus may increase a gain of a filter (e.g., BBF 326) that filters the downconverted signal (e.g., generated from the downconversion using the second frequency). The apparatus may increase the gain of the filter concurrently with the switching to downconverting the RF signal using the oscillating signal with the second frequency.

The second frequency may be an odd subharmonic of the first frequency. In some aspects, the second frequency may be a third subharmonic of the first frequency (e.g., n=3 in Equation (1)). In some aspects, the second frequency may be a fifth subharmonic of the first frequency (e.g., n=5 in Equation (1)). In some aspects, the apparatus may downconvert the RF signal using the oscillating signal with the second frequency during a power saving mode of the apparatus. During the power saving mode, the apparatus may be in a second power mode (e.g., second power mode described with respect to FIG. 4).

In some aspects, the switching may occur while waiting for a packet addressed to the apparatus (e.g., the apparatus may be in PDCCH mode). In some aspects, the property associated with the RF signal may indicate a presence of a jammer. In some aspects, the property associated with the RF signal may include an SNR of the RF signal. In such cases, the switching may be based on the SNR of the RF signal at the second time being above a threshold.

In some aspects, the operations 600 may further include switching back to downconverting the RF signal using the oscillating signal with the first frequency, based on the property associated with the RF signal at a third time. In these aspects, the property associated with the RF signal may indicate a presence of a jammer.

In some aspects, the operations 600 may further include switching to downconverting the RF signal using the oscillating signal with a third frequency, based on the property associated with the RF signal at a third time. The third frequency may be another subharmonic of the first frequency and may be the same or different from the second frequency. For example, the second frequency may include a third subharmonic of the first frequency, and the third frequency may include a fifth subharmonic of the first frequency, or vice versa.

Note that while many of the aspects described herein relate to dynamically performing subharmonic mixing on the RX chain, aspects described herein are not limited to such and can be used to dynamically perform subharmonic mixing on the TX chain. For example, in some scenarios, the communication device may operate in a communication mode in which transmit signals from the communication device interfere with receiver operations by the communication device. As a reference example, certain carrier aggregation (CA) modes may involve transmit operations on a first band of the CA mode that fall within a receive range of a second band of the CA mode.

Certain aspects of the present disclosure provide techniques for mitigating (or avoiding) the jamming due to one or more transmit or out-of-band (OOB) jammer signals from self-transmit or other signals. In some aspects, depending on the band and signal condition, aspects can tune the LO in the TX chain (e.g., implemented by a TX frequency synthesizer 318 to produce a transmit LO frequency) to a new frequency (e.g., using Equation (1)) in order to dodge the jammer signals. In one example, for the n41 band, assuming a 900 MHz band TX jammer is present, then the LO with a frequency of 540 MHz can be chosen.

In some aspects, the LO frequency switch may be disabled if the communication device is operating in a CA mode where the transmitter is present at a particular subharmonic. Additionally or alternatively, if a wideband jammer is detected (e.g., by triggering with the quadrature low noise amplifier (QLNA)), then the LO frequency switch may be disabled.

In some aspects, the TX chain may be configured to dynamically perform subharmonic mixing (e.g., implement a subharmonic mode) when the TX chain is in a low power mode (e.g., the TX chain has a low power output (Pont)) in order to optimize, or at least reduce, power consumption (e.g., when the communication device is in close proximity to the base station). When the TX chain is in a low gain state, the spurious emission specification may be reduced as the output power is lowered. In some cases, the lower power when the TX chain is performing subharmonic mixing can be supplemented by a TX DAC (e.g., DAC 308). In some cases, since subharmonic mixing may be used in the lower power output stage, the reduction of gain during subharmonic mixing (e.g., up to 9 dB with the $3^{rd}$ harmonic) can be accommodated in the low power state.

Figure 7:
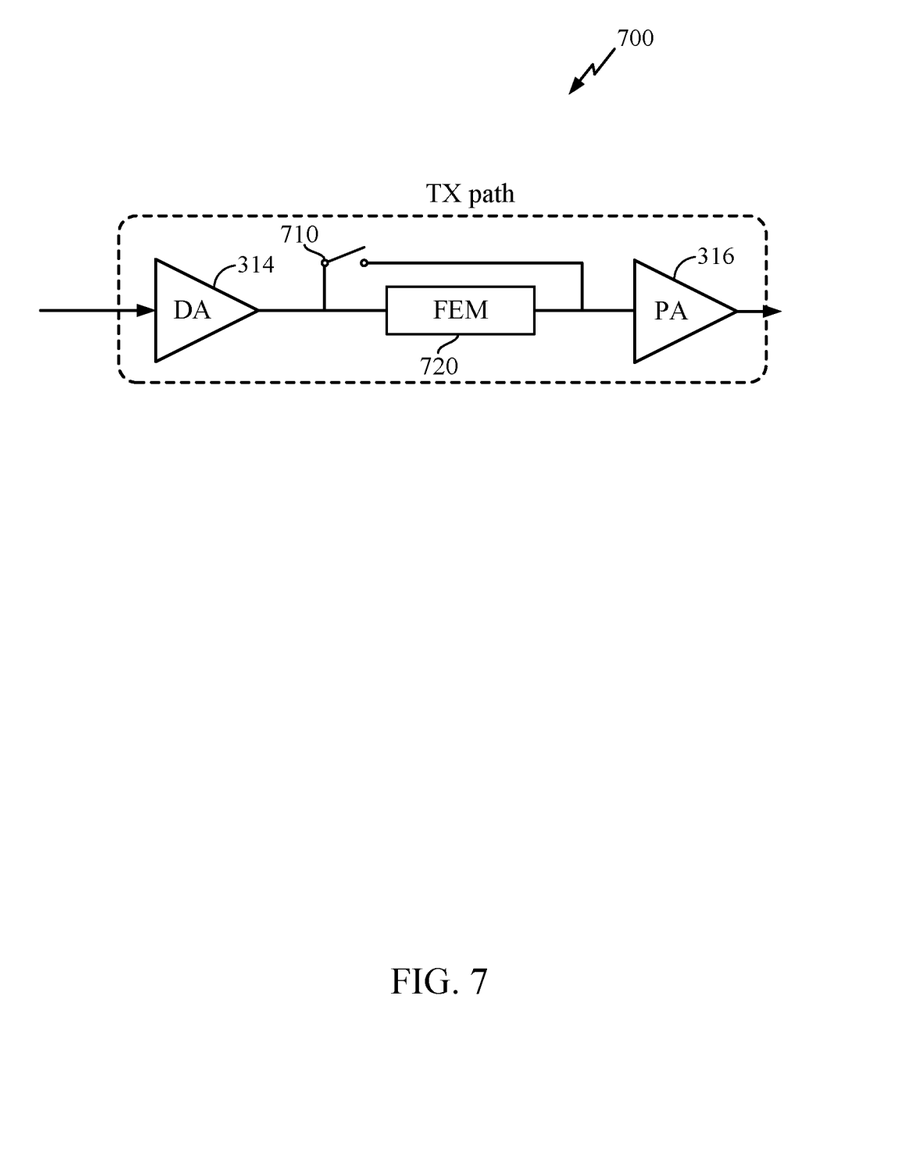
FIG. 7 is a block diagram of a portion of an example transmit path of a transceiver front end, in accordance with certain aspects of the present disclosure.

In some aspects, when the TX chain is in a low power mode, the TX chain can use a filter to reject the fundamental power. On the other hand, when the TX chain is in a high power mode, the TX chain can bypass the filter to avoid the filter loss in the line-up. FIG. 7 is a block diagram of a portion of an example TX path 700 (also known as a transmit chain) that can be used to reject the fundamental power when operating in a low power mode, in accordance with certain aspects of the present disclosure. The TX path 700 may be similar to the TX path 302 illustrated in FIG. 3. For example, the TX path 700 may include one or more similar components as the TX path 302. In this example, the TX path 700 includes a DA 314, a bypass switch 710, a front-end module (FEM) 720, and a PA 316.

In some aspects, the FEM 720 may filter out (e.g., reject) the fundamental power of a signal output from the DA 314 when the TX path 700 is operating in a low power mode. In particular, the transceiver front end can control the bypass switch 710 to couple the FEM 720 to the TX path 700 when operating in the low power mode. In contrast, when operating in a high power mode (e.g., with the fundamental frequency), the transceiver front end can control the bypass switch 710, so that the FEM 720 is bypassed prior to the input of the PA 316.

Example Aspects

In addition to the various aspects described above, specific combinations of aspects are within the scope of the disclosure, some of which are detailed below:

Aspect 1: A method of wireless communication by an apparatus, comprising: receiving a radio frequency (RF) signal; downconverting the RF signal using an oscillating signal with a first frequency at a first time; and based on a property associated with the RF signal at a second time, switching to downconverting the RF signal using the oscillating signal with a second frequency, the second frequency being a subharmonic of the first frequency.

Aspect 2: The method according to Aspect 1, wherein the property associated with the RF signal comprises a signal-to-noise ratio (SNR) of the RF signal.

Aspect 3: The method according to Aspect 2, wherein the switching is based on the SNR of the RF signal at the second time being above a threshold.

Aspect 4: The method according to Aspect 1, wherein the RF signal comprises a physical downlink control channel (PDCCH).

Aspect 5: The method according to Aspect 1, wherein the RF signal comprises downlink control information (DCI).

Aspect 6: The method according to Aspect 1, wherein the switching occurs while waiting for a packet addressed to the apparatus.

Aspect 7: The method according to Aspect 1, further comprising switching back to downconverting the RF signal using the oscillating signal with the first frequency, based on the property associated with the RF signal at a third time.

Aspect 8: The method according to Aspect 7, wherein the property associated with the RF signal indicates a presence of a jammer.

Aspect 9: The method according to Aspect 1, further comprising switching to downconverting the RF signal using the oscillating signal with a third frequency, based on the property associated with the RF signal at a third time, the third frequency being another subharmonic of the first frequency and different from the second frequency.

Aspect 10: The method according to Aspect 9, wherein the second frequency comprises a third subharmonic of the first frequency and wherein the third frequency comprises a fifth subharmonic of the first frequency.

Aspect 11: The method according to Aspect 1, wherein the downconverting the RF signal using the oscillating signal with the first frequency or the second frequency generates a downconverted signal, and wherein the method further comprises: filtering the downconverted signal with a filter; and increasing a gain of the filter concurrently with the switching to downconverting the RF signal using the oscillating signal with the second frequency.

Aspect 12: The method according to Aspect 1, wherein the second frequency is a third subharmonic of the first frequency.

Aspect 13: The method according to Aspect 1, wherein the second frequency is a fifth subharmonic of the first frequency.

Aspect 14: The method according to Aspect 1, wherein the property associated with the RF signal indicates a presence of a jammer.

Aspect 15: The method according to Aspect 1, wherein: the downconverting the RF signal using the oscillating signal with the first frequency is for a regular sampling mode of the apparatus; and the downconverting the RF signal using the oscillating signal with the second frequency is for a power saving mode of the apparatus.

Aspect 16: An apparatus for wireless communication, comprising: a frequency synthesizer configured to generate an oscillating signal; and a mixer coupled to the frequency synthesizer and configured to downconvert a radio frequency (RF) signal using the oscillating signal, wherein the frequency synthesizer is configured to: generate the oscillating signal with a first frequency at a first time; and based on a property associated with the RF signal at a second time, switch to generating the oscillating signal with a second frequency, the second frequency being a subharmonic of the first frequency.

Aspect 17: The apparatus according to Aspect 16, wherein the second frequency is a third subharmonic of the first frequency.

Aspect 18: The apparatus according to Aspect 16, wherein the second frequency is a fifth subharmonic of the first frequency.

Aspect 19: The apparatus according to Aspect 16, wherein the property associated with the RF signal comprises a signal-to-noise ratio (SNR) of the RF signal.

Aspect 20: An apparatus for wireless communication, comprising: means for receiving a radio frequency (RF) signal; means for downconverting the RF signal using an oscillating signal with a first frequency at a first time; and means for switching to downconverting the RF signal using the oscillating signal with a second frequency, based on a property associated with the RF signal at a second time, the second frequency being a subharmonic of the first frequency.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. For example, means for receiving may include, for example, a receiver (e.g., transceiver front end 300), an antenna(s) (e.g., antenna(s) 303), etc. Means for downconverting may include, for example, a mixer (e.g., mixer 324). Means for generating an oscillating signal may include, for example, a frequency synthesizer (e.g., RX frequency synthesizer 330). Means for switching to downconverting a signal using the oscillating signal with another frequency may include, for example, a frequency synthesizer (e.g., RX frequency synthesizer 330) and/or control logic (e.g., controller 280). Means for filtering may include, for example, a BBF (e.g., BBF 326).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with discrete hardware components designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of wireless communication by an apparatus, comprising:
    receiving a radio frequency (RF) signal;
    downconverting the RF signal using an oscillating signal with a first frequency at a first time; and
    based at least on a an indication of a signal-to-noise ratio (SNR) of the RF signal at a second time, switching to downconverting the RF signal using the oscillating signal with a second frequency, the second frequency being a subharmonic of the first frequency.

2. The method of claim 1, wherein the switching is based on the SNR of the RF signal at the second time being above a threshold.

3. The method of claim 1, wherein the RF signal comprises a physical downlink control channel (PDCCH).

4. The method of claim 1, wherein the RF signal comprises downlink control information (DCI).

5. The method of claim 1, wherein the switching occurs while waiting for a packet addressed to the apparatus.

6. The method of claim 1, further comprising switching back to downconverting the RF signal using the oscillating signal with the first frequency, based on the property associated with the RF signal at a third time.

7. The method of claim 6, wherein the property associated with the RF signal indicates a presence of a jammer.

8. The method of claim 1, further comprising switching to downconverting the RF signal using the oscillating signal with a third frequency, based on the property associated with the RF signal at a third time, the third frequency being another subharmonic of the first frequency and different from the second frequency.

9. The method of claim 8, wherein the second frequency comprises a third subharmonic of the first frequency and wherein the third frequency comprises a fifth subharmonic of the first frequency.

10. The method of claim 1, wherein the downconverting the RF signal using the oscillating signal with the first frequency or the second frequency generates a downconverted signal, and wherein the method further comprises:
    filtering the downconverted signal with a filter; and
    increasing a gain of the filter concurrently with the switching to downconverting the RF signal using the oscillating signal with the second frequency.

11. The method of claim 1, wherein the second frequency is a third subharmonic of the first frequency.

12. The method of claim 1, wherein the second frequency is a fifth subharmonic of the first frequency.

13. The method of claim 1, wherein the property associated with the RF signal indicates a presence of a jammer.

14. The method of claim 1, wherein:
    the downconverting the RF signal using the oscillating signal with the first frequency is for a regular sampling mode of the apparatus; and
    the downconverting the RF signal using the oscillating signal with the second frequency is for a power saving mode of the apparatus.

15. An apparatus for wireless communication, comprising:
    a frequency synthesizer configured to generate an oscillating signal; and
    a mixer coupled to the frequency synthesizer and configured to downconvert a radio frequency (RF) signal using the oscillating signal, wherein the frequency synthesizer is configured to:
        generate the oscillating signal with a first frequency at a first time; and
        based at least on a an indication of a signal-to-noise ratio (SNR) of with the RF signal at a second time, switch to generating the oscillating signal with a second frequency, the second frequency being a subharmonic of the first frequency.

16. The apparatus of claim 15, wherein the second frequency is a third subharmonic of the first frequency.

17. The apparatus of claim 15, wherein the second frequency is a fifth subharmonic of the first frequency.

18. An apparatus for wireless communication, comprising:
    means for receiving a radio frequency (RF) signal;
    means for downconverting the RF signal using an oscillating signal with a first frequency at a first time; and
    means for switching to downconverting the RF signal using the oscillating signal with a second frequency, based at least on a an indication of a signal-to-noise ratio (SNR) of the RF signal at a second time, the second frequency being a subharmonic of the first frequency.

* * * * *